United States Patent
Keith

(10) Patent No.: US 7,231,091 B2
(45) Date of Patent: Jun. 12, 2007

(54) SIMPLIFIED PREDICTIVE VIDEO ENCODER

(75) Inventor: Michael Keith, Salem, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/129,558

(22) Filed: May 16, 2005

(65) Prior Publication Data

US 2005/0265615 A1 Dec. 1, 2005

Related U.S. Application Data

(63) Continuation of application No. 09/209,828, filed on Dec. 11, 1998, now Pat. No. 6,904,174.

(60) Provisional application No. 60/101,251, filed on Sep. 21, 1998.

(51) Int. Cl.
*G06K 9/36* (2006.01)

(52) U.S. Cl. .................. 382/239; 382/236; 382/238

(58) Field of Classification Search ............. 382/238, 382/236, 239, 232; 381/109; 380/222; 705/51; 386/68, 81; 375/240.23, 240, 240.27, 375/240.24, 240.26, 240.03, 240.12, 242; 348/419, 699, 47, 222.1; 336/86, 16, 56; 341/67, 51

See application file for complete search history.

(56) References Cited

U.S. PATENT DOCUMENTS

| | | | |
|---|---|---|---|
| 3,716,851 A * | 2/1973 | Neumann ................. 341/67 |
| 4,023,110 A * | 5/1977 | Oliver .................... 327/12 |
| 4,131,765 A | 12/1978 | Kahn ..................... 704/205 |
| 4,217,609 A * | 8/1980 | Hatori et al. ......... 375/240.13 |
| 4,394,774 A | 7/1983 | Widergren et al. ...... 382/232 |
| 4,437,119 A * | 3/1984 | Matsumoto et al. ... 375/240.13 |
| 4,670,851 A | 6/1987 | Murakami et al. ......... 364/518 |
| 4,698,672 A | 10/1987 | Chen et al. ............. 358/136 |
| 4,760,446 A | 7/1988 | Ninomiya et al. ........ 358/105 |
| 4,837,618 A * | 6/1989 | Hatori et al. ............ 348/401.1 |
| 4,864,393 A | 9/1989 | Harradine et al. ........ 358/105 |
| 4,901,075 A | 2/1990 | Vogel .................... 341/63 |
| 5,010,401 A | 4/1991 | Murakami et al. ........ 358/136 |
| 5,021,879 A | 6/1991 | Vogel .................... 358/105 |
| 5,068,724 A | 11/1991 | Krause et al. ............ 358/133 |
| 5,091,782 A | 2/1992 | Krause et al. ............ 358/135 |
| 5,093,720 A | 3/1992 | Krause et al. ............ 358/133 |
| 5,113,255 A | 5/1992 | Nagata et al. ............ 358/136 |
| 5,168,375 A | 12/1992 | Reisch et al. ........... 358/432 |
| 5,175,618 A | 12/1992 | Ueda et al. ............. 358/136 |

(Continued)

OTHER PUBLICATIONS

Coding of Moving Pictures and Associated Audio Information, ISO/IED JTC1/SC29/WG11 Video Group (Feb. 1996).

(Continued)

*Primary Examiner*—Anh Hong Do
(74) *Attorney, Agent, or Firm*—Kenyon & Kenyon LLP

(57) ABSTRACT

In a video coding method, it is determined to code input video data according a technique selected from the group of: (a) intra-coding, (b) inter-coding without a residual and (c) inter-coding with a residual, wherein inter-coding codes the input video data with reference to coded video data at another time. When it is determined to code the input video data according to type (c) decoded video data of another frame is decoded and the the input data is coded according to the selected technique.

19 Claims, 2 Drawing Sheets

U.S. PATENT DOCUMENTS

| | | | |
|---|---|---|---|
| 5,223,949 A | 6/1993 | Honjo | 358/426 |
| 5,260,783 A | 11/1993 | Dixit | 375/240.13 |
| 5,293,229 A | 3/1994 | Iu | 348/415 |
| 5,298,991 A | 3/1994 | Yagasaki et al. | 348/416 |
| 5,317,397 A | 5/1994 | Odaka et al. | 348/416 |
| 5,329,318 A | 7/1994 | Keith | 348/699 |
| 5,343,248 A | 8/1994 | Fujinami | 348/452 |
| 5,377,051 A | 12/1994 | Lane et al. | 386/81 |
| 5,412,430 A | 5/1995 | Nagata | 348/402 |
| RE34,965 E | 6/1995 | Sugiyama | 348/415 |
| 5,428,396 A | 6/1995 | Yagasaki et al. | 348/416 |
| RE35,093 E | 11/1995 | Wang et al. | 348/413 |
| 5,469,208 A | 11/1995 | Dea | 348/27 |
| 5,469,212 A | 11/1995 | Lee | 348/392 |
| RE35,158 E | 2/1996 | Sugiyama | 348/401 |
| 5,497,239 A * | 3/1996 | Kwon | 386/111 |
| 5,510,840 A | 4/1996 | Yonemitsu et al. | 348/402 |
| 5,539,466 A | 7/1996 | Igarashi et al. | 348/401 |
| 5,543,843 A * | 8/1996 | Kato et al. | 348/400.1 |
| 5,543,847 A | 8/1996 | Kato | 348/415 |
| 5,557,330 A | 9/1996 | Astle | 348/394 |
| 5,559,557 A | 9/1996 | Kato | 348/405 |
| 5,565,920 A | 10/1996 | Lee et al. | 348/398 |
| 5,568,200 A | 10/1996 | Pearlstein et al. | 348/426 |
| 5,587,806 A | 12/1996 | Yamada et al. | 386/68 |
| 5,625,355 A | 4/1997 | Takeno et al. | 341/67 |
| 5,648,733 A | 7/1997 | Worrell et al. | 326/86 |
| 5,654,706 A | 8/1997 | Jeong | 341/67 |
| 5,666,461 A | 9/1997 | Igarashi et al. | 386/95 |
| 5,684,534 A | 11/1997 | Harney et al. | 375/240.2 |
| 5,703,646 A * | 12/1997 | Oda | 375/240.13 |
| 5,711,012 A * | 1/1998 | Bottoms et al. | 455/557 |
| 5,719,986 A | 2/1998 | Kato et al. | 386/109 |
| 5,831,688 A | 11/1998 | Yamada et al. | 348/699 |
| 5,841,939 A | 11/1998 | Takahashi et al. | 386/68 |
| 5,852,664 A | 12/1998 | Iverson et al. | 705/51 |
| 5,887,111 A | 3/1999 | Takahashi et al. | 386/68 |
| 5,917,954 A | 6/1999 | Girod et al. | 382/248 |
| 5,946,043 A | 8/1999 | Lee et al. | 348/440 |
| 5,949,948 A | 9/1999 | Krause et al. | 386/6 |
| 5,991,447 A | 11/1999 | Eifrig et al. | 382/236 |
| 5,991,503 A | 11/1999 | Miyasaka et al. | 386/111 |
| 6,052,507 A | 4/2000 | Niida et al. | 386/68 |
| 6,064,776 A * | 5/2000 | Kikuchi et al. | 382/260 |
| 6,081,296 A | 6/2000 | Fukunaga et al. | 348/415 |
| 6,081,551 A | 6/2000 | Etoh | 375/240 |
| RE36,761 E | 7/2000 | Fujiwara | 348/419 |
| 6,088,391 A | 7/2000 | Auld et al. | 375/240 |
| 6,115,070 A | 9/2000 | Song et al. | 348/402 |
| 6,125,146 A | 9/2000 | Frencken et al. | 375/240.24 |
| 6,141,383 A | 10/2000 | Yu | 375/240.23 |
| 6,144,698 A | 11/2000 | Poon et al. | 375/240 |
| 6,167,087 A | 12/2000 | Kato | 375/240.03 |
| 6,169,821 B1 | 1/2001 | Fukunaga et al. | 382/239 |
| 6,188,725 B1 | 2/2001 | Sugiyama | 375/420 |
| 6,217,234 B1 | 4/2001 | Dewar et al. | 395/200.77 |
| 6,256,420 B1 * | 7/2001 | Sako et al. | 382/239 |
| 6,563,549 B1 | 5/2003 | Sethuraman | 348/700 |

OTHER PUBLICATIONS

Digital Video: An Introduction to MPEG-2, Barry G. Haskell, Atul Puri and Arun N. Netravali.

MPEG-4 Video Verification Model Version 6.0, Ad hoc group on MPEG-4 video VM Editing, Int'l. Organisation for Standardisation, ISO/IEC JTC1/SC29/WG11, MPEG96/M1582, Sevilla, Feb. 1996.

Digital Video: An Introduction to MPEG-2, Haskell et al., Digital Multimedia Standards Series, pp.-110-411.

Puri & Chen, editors, Multimedia Systems, Standards and Networks, Chapter 3, pp. 55-64, Marcel Dekker, Inc., New York, 2000.

* cited by examiner

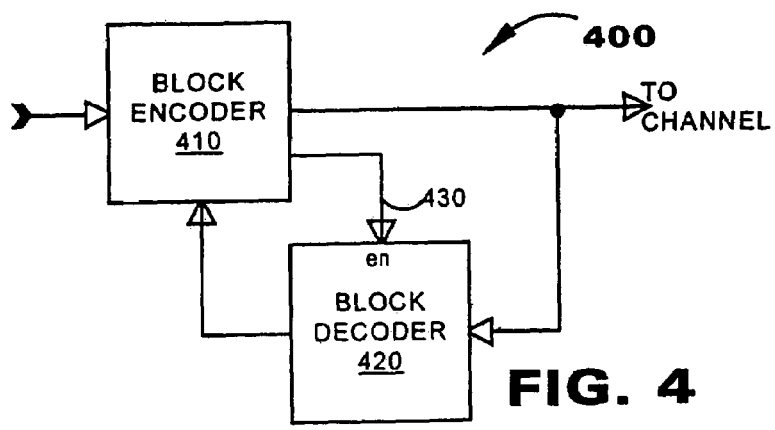
FIG. 4
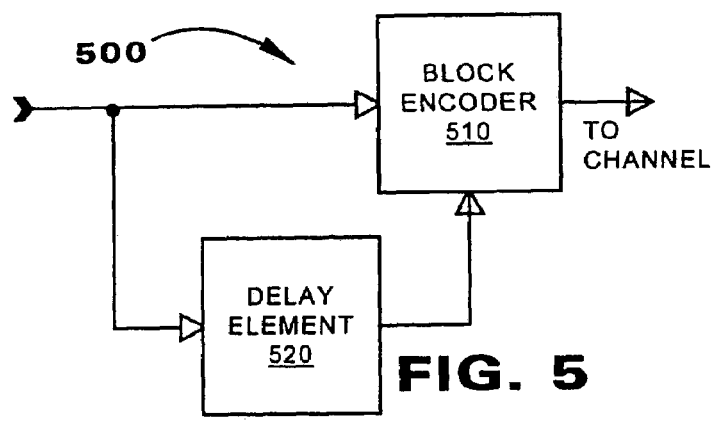
FIG. 5
FIG. 6
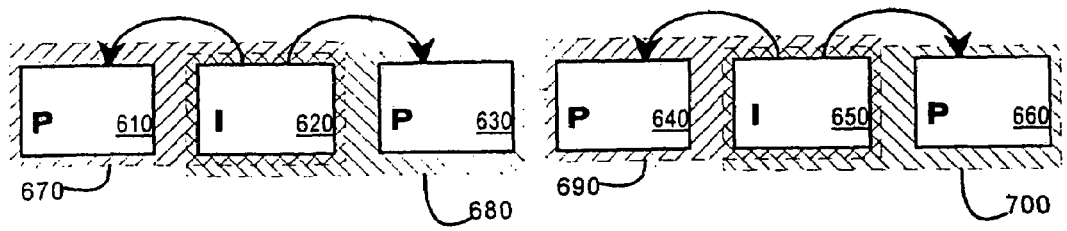

SIMPLIFIED PREDICTIVE VIDEO ENCODER

CROSS-REFERENCE TO RELATED APPLICATION

This application is a continuation application that claims the benefit of U.S. application Ser. No. 09/209,828, now U.S. Pat. No. 6,904,174 (filed Dec. 11, 1998); which claims benefit of 60/101,251filed Sep. 21, 1998, which applications are incorporated herein in their entirety.

BACKGROUND

The present invention relates to video coders and, more particularly, to predictive video encoders.

FIG. 1 illustrates a simplified video coding system. The system includes an encoder 100 provided in communication with a decoder 200 over a channel 300. The encoder 100 receives original video data at an input. It generates coded video data from the original video data and outputs the coded video data to the channel 300. The channel 300 may be a communication link, such as those provided by telecommunications networks or computer networks, or may be a memory such as an optical, electric or magnetic storage device. The decoder 200 retrieves the coded video data from the channel 300 and, by inverting the coding process performed by the encoder 100, reconstructs the original video data therefrom. Depending upon the coding/decoding techniques used, the reconstructed video data may be either an exact replica or merely a close approximation of the original video data.

Coded video data consumes less bandwidth than uncoded video data. Encoders 100 employ coding techniques that exploit redundancy in the uncoded video data. A variety of coding techniques are known; they vary in terms of bandwidth conservation and computational complexity imposed upon the encoder and/or decoder.

One type of known video coder is the "predictive coder." In a predictive coder, coded video data at one time may be coded using video data at another time as a reference. An example is shown in FIG. 2. FIG. 2 illustrates several frames 10–50 of video information, each frame representing the video data at different times. An intra-coded (I) frame 10, 50 is coded "from scratch." That is, an I frame may be decoded based solely on the coded video data for that frame; the coded video data makes no reference to data of any other frame. By contrast, predictively coded (P) frames 20–40 are coded with reference to other frames. To decode a P frame (e.g, 20), a decoder 200 retrieves coded data for both the P frame and reconstructed data previously decoded for another frame (e.g. I frame 10). Prediction arrows 60–80 illustrate possible prediction directions. A frame usually occupies less bandwidth when coded as a P frame rather than as an I frame.

Predictive coders establish "prediction chains," a series of frames wherein reconstructed data of one frame is used to predict the reconstructed data of another. Frames 10–40 in FIG. 2 illustrate a four frame prediction chain. An originating frame is coded as an I frame but all others in the chain are coded a P frames. Because the P frames achieve more bandwidth conservation than I frames, many coders extend prediction chains as far as possible. Some coding systems also force an encoder 100 to introduce an I frame even when unreasonable coding errors would not otherwise be present. By introducing I frames at regular intervals, decoders 200 may perform random access functions, akin to fast-forwarding and rewinding, that would not otherwise be possible.

As is known, predictive coders may code input video data on a block basis. Input video data may be broken down in to "blocks" (also called "macroblocks" in some coding applications), arrays of video data of a predetermined size. Each block of a frame is coded independently of the other blocks in the frame.

In a P frame, a predictive coder may code a block of data as one of three types:
  (a) An Intra-Coded Block: The block is coded without reference to any block in any other frame;
  (b) An Inter-Coded Block Sans Residual: Image data for the block is copied from a block in another frame and displayed without modification; or
  (c) An Inter-Coded Block Plus a Residual: Image data for the block is copied from a block in another frame and supplemented with an error term (called a "residual") that is supplied in the channel 300.

FIG. 3 is a block diagram that illustrates processing that may be performed by an encoder 100 to code video data predictively. The encoder 100 may include a block encoder 110 and a block decoder 120. The block encoder 110 receives a block of input video data at a first input and blocks of decoded video data from the block decoder 120. For a P frame, the block encoder 110 determines how to code the block (whether as type (a), (b) or (c) above). The block encoder 110 outputs coded video data to the channel 300. In this regard, operation of the block encoder 110 is well-known.

The block decoder 120 receives coded video data from the block encoder 110 and decodes it. The decoded video data of a frame is stored at the block decoder 120 ready to be input back to the block encoder 110 to be used as a reference for predictive coding of later frames. In this regard, operation of the block decoder 120 is well-known.

The block decoder 120 permits the encoder 100 to "see" the reconstructed video data that the decoder 200 (FIG. 1) will obtain by decoding coded video data from the channel 300. The block decoder 120 permits the block encoder 110 to generate accurate residuals when coding blocks according to type (c) above. The block decoder 120 prevents prediction errors from compounding over a series of frames that would occur if type (c) blocks were used to predict other type (c) blocks in a prediction chain.

Reconstruction of coded data is a computationally expensive task. Provision of the block decoder 120 in an encoder 100 increases its complexity and expense. There is a need in the art for an encoder 100 that is less expensive and more simplified in implementation than known encoders.

SUMMARY

An embodiment of the present invention provides a video coding method in which it is determined to code input video data according a technique selected from the group of: (a) intra-coding, (b) inter-coding without a residual and (c) inter-coding with a residual, wherein inter-coding codes the input video data with reference to coded video data at another time. When it is determined to code the input video data according to type (c) decoded video data of another frame is decoded and the input data is coded according to the selected technique.

BRIEF DESCRIPTION OF THE DRAWINGS

FIG. 4 is a block diagram of processing performed in a predictive encoder according to an embodiment of the present invention.

FIG. 5 is a block diagram of processing performed in a predictive encoder according to another embodiment of the present invention.

FIG. 6 illustrates prediction chains that may be developed according to an embodiment of the present invention.

DETAILED DESCRIPTION

In a first embodiment of the present invention, an encoder is populated by a block encoder and a block decoder. The block encoder and block decoder perform image processing as is done in prior art systems except that the block encoder disables the block decoder unless coding a block according to type (c). In a second embodiment, the encoder is populated by a block encoder and a delay buffer. The block encoder performs image coding in a manner similar to those of prior systems except that, for blocks of type (c), the block encoder calculates a residual with reference to original video data rather than reconstructed video data.

FIG. 4 illustrates an encoder 400 constructed in accordance with an embodiment of the present invention. The encoder 400 includes a block encoder 410 and block decoder 420. The block encoder 410 determines to code and codes blocks of input video data as types (a), (b) and/or (c) according to processes that are known in the art. The block decoder 420 decodes coded video data output from the block encoder 410 also according to processes that are known in the art and outputs reconstructed video data back to the block encoder 410. The block encoder 410 may enable or disable the block decoder 420 via a control line 430.

According to an embodiment of the present invention, the block encoder 410 suspends the block decoder 420 unless it determines to code a block as a type (c) block. Reconstructed video data need not be input to the block encoder 410 for the block encoder to be able to code input video data according to type (a) or (b). If a block is to be coded as a type (c) block, the block encoder 410 engages the block decoder 420. The block decoder decodes 420 previously coded video data and outputs reconstructed video data of the block back to the block encoder 410. The block encoder 410 codes the type (c) block and thereafter disables the block decoder 420 until (and unless) it determines to code another block of input video data as a type (c) block.

Experiments indicate that about 60–70% of an I frame are decoded during operation of the present invention. As compared to prior art encoders that decode every I frame (e.g., 100%), this embodiment of the present invention improves encoder efficiency by about 30–40%.

Figure 1:
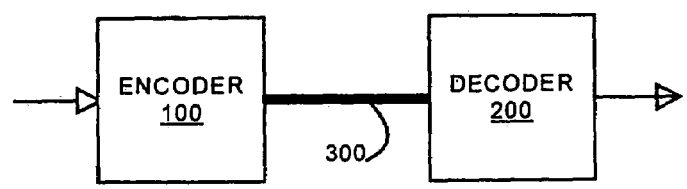
FIG. 1 is a block diagram of a video coding/decoding system.
Figure 2:
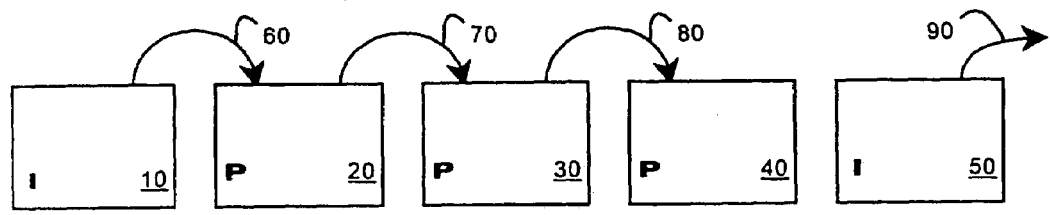
FIG. 2 is an illustration of predictively coded frames.
Figure 3:
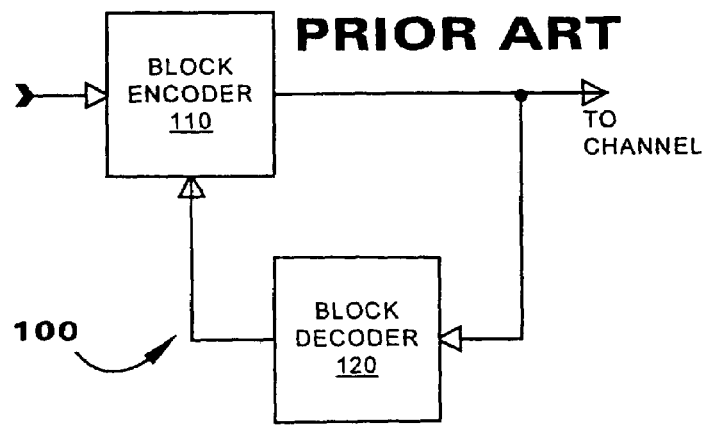
FIG. 3 is a block diagram of a known predictive encoder.

FIG. 5 illustrates an encoder 500 constructed in accordance with another embodiment of the present invention. The encoder 500 includes a block encoder 510 and a delay element 520. It does not include a block decoder (such as 120 or 420 of FIGS. 3 or 4). The block encoder 510 codes blocks of input video data and outputs coded video data to the channel 300 (FIG. 1). The delay element 520 receives the blocks of input video data and stores them. The delay element 520 inputs the blocks of input video data to the block encoder 510.

As in the system of FIG. 4, the block encoder 510 determines to code the blocks of input video data as type (a), (b) or (c). When it determines to code a block as type (a) or (b), the block encoder 510 codes the block as does the block encoder 410 of FIG. 4.

When the block encoder 510 determines to code a block as type (c), the block encoder 510 calculates a residual based upon delayed original video data received from delay element 520. This configuration eliminates the need for a block decoder 420 as in the encoder 400 of FIG. 4 and further reduces the complexity of the encoder 500. However, because the encoder 500 generates residuals of type (c) without reference to reconstructed video data, the encoder 500 codes data with less accuracy than may be obtained using, for example, the encoder 400 of FIG. 4.

According to an embodiment of the present invention, the encoder 500 of FIG. 5 is used with short prediction chains. Exemplary prediction chains are shown in FIG. 6. There, a series of video frames 610–660 are shown coded in prediction chains 670–700 having only a single "link" each (two frames per chain). For each I frame 620, 650, there are twice as many P frames 610, 630–640, 660. Each I frame (e.g., 620) is used as a source for prediction of two P frames, one 610 immediately before the I frame 620 and one 630 immediately after the I frame 620. Slightly longer prediction chains may be used, such as two link prediction chains.

As noted above, the encoder 500 introduces coding errors in the reconstructed video data. The embodiment of FIG. 5 represents a trade-off between image quality and bandwidth on the one hand and encoder complexity on the other. However, the added coding errors contribute little to subjective image quality degradation. It is believed that the coding errors are ameliorated for several reasons. First, the coding errors are introduced only when coding blocks of type (c). For blocks of type (a) and type (b), the coding performed by the encoder 500 is just as accurate as coding done by the encoders 100, 400 of FIGS. 3 or 4. Also, when the encoder 500 is used in combination with the short, one or two-link prediction chains, coding errors do not accumulate over more than one or two frames (i.e., the length of the prediction chain).

Further, when used in combination with short prediction chains, the encoder 500 provides a relatively high percentage of I frames in the coded output data. The high percentage of I frames also mitigates the subjective effect of coding errors that may occur in type (c) coded blocks. Again, the encoder 500 codes I frames just as accurately as do the encoders 100, 400 of FIGS. 3 or 4. And, as is known, human beings tend to disregard frames having significant coding errors when those frames are interspersed among accurately coded frames. The accurately coded I frames are more perceptually significant than the type (c) blocks of P frame. Thus, any errors present in type (c) blocks are mitigated naturally.

The embodiments of FIGS. 4 and 5 may be implemented as hardware devices, software devices or hybrid hardware and software devices. As a hardware device, the embodiments of FIGS. 4 and 5 may be implemented in, for example, an application specific integrated circuit. As a software device, the embodiments of FIGS. 4 and 5 may be implemented in a general purpose processor or a digital signal processor executing program instructions that cause the processor to perform block encoding and, possibly, block decoding functions (depending upon the embodiment). Such program instructions would be stored, most likely, in a storage device such as an electric, optical or magnetic memory and loaded into the general purpose processor or digital signal processor for execution. The present invention facilitates software implementations by reducing the number of calculations required for coding video data.

Throughout this discussion, reference has been made to "I frames," "P frames," intra-coding and inter-coding, "blocks" and "macroblocks." Such nomenclature may be found in certain video coding standards. It is used for illustrative purposes only and not meant to limit the scope of the present invention to any coding standard or family of standards. The embodiments of the present invention herein described are applicable to predictive coders generally, not to any specific type of predictive coder.

As exemplary predictive coders, the present invention may be applied to coders operating in conformance with one or more of the following standards: "MPEG-2," ISO 13818, *Information Technology-Generic Coding of Moving Pictures and Associated Audio*; "MPEG-4," *Requirements Version* 4, ISO/EIC JTCI/SC29/WG11 N 1716 (1997); ITU-T, Recommendation H.261, "Video Codec for Audio Visual Services at px64 kbit/s," 1990; ITU-T H.263+Video Group, "Draft 12 of ITU-T Recommendation H.263+" 1997, and their successors. Accordingly, video data may be coded in items based on video frames, video objects or other structures as may be conventional to the predictive techniques used by the encoders of the prior art. Additionally, the intra-coding and inter-coding techniques (with or without a residual) that are performed may be performed on units of data such as blocks, macro-blocks or other organizational units of video data as may be known. "Block," as used herein, is used in a generic sense and is meant to encompass all of these organizational units of input video data. Such variances among coding techniques, items and units are consistent with the scope and spirit of the present invention.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A video coder, comprising:
    a block encoder having an input for blocks of input data and an output for coded video data, adapted to code the blocks of input data according to techniques selected from the group of: (a) intra coding, (b) inter coding without a residual and (c) inter coding with a residual,
    a delay element having an input for the blocks of input data and an output for delayed video data that is input to the block encoder,
    wherein the output of the delay element is discarded when coding according to type (a) or (b),
    wherein, for a block to be coded according to type (c), the block encoder is adapted to code a residual using one of the blocks of the output from the delay element.

2. The video coder of claim 1, wherein the block encoder is to output prediction chains, each prediction chain beginning with a frame of intra coded blocks.

3. The video coder of claim 2, wherein the prediction chains have a length of at least two.

4. The video coder of claim 2, wherein the frame of intra coded blocks is a source for predicting a preceding frame and a subsequent frame to the frame of intra coded blocks.
    a block encoder having an input for blocks of input data and an output for coded video data, adapted to code the blocks of input data according to techniques selected from the group of: (a) intra coding, (b) inter coding without a residual and (c) inter coding with a residual,
    a delay element having an input for the blocks of input data and an output for delayed video data that is input to the block encoder,
    wherein the output of the delay element is discarded when coding according to type (a) or (b),
    wherein, for a block to be coded according to type (c), the block encoder is adapted to code a residual using one of the blocks of the output from the delay element.

5. A video coding method, comprising:
    receiving a block of input video data in a current frame,
    determining to code the block of input video data according to a technique selected from (a) intra coding, (b) inter coding without a residual and (c) inter coding with a residual,
    coding the block according to the selected technique,
    when the block is to be coded according to type (a) of (b), discarding the output of the delay element, and
    when the block is to be coded according to type (c), coding the residual using one of the blocks of input video data delayed from another frame.

6. The video coding method of claim 5, further comprising coding blocks of every third frame according to intra coding.

7. The video coding method of claim 5, wherein the determining and coding steps generate prediction chains, each prediction chain beginning with a frame of intra coded blocks.

8. The video coding method of claim 7, wherein the prediction chains have a length of two.

9. The video coding method of claim 7, wherein the prediction chains have a length of three.

10. A computer readable medium, on which is stored program instructions that, when executed by a processor, cause the processor to:
    receive a block of input video data in a current frame,
    determine to code the block of input video data according to a technique selected from (a) intra coding, (b) inter coding without a residual and (c) inter coding with a residual,
    code the block according to the selected technique,
    when the block is to be coded according to type (a) or (b), disregard the blocks of input video data delayed from another frame, and
    when the block is to be coded according to type (c), code the residual using one of the blocks of input video data delayed from another frame.

11. The computer readable medium of claim 10, wherein the processor is to:
    code every third block of input video data using technique (a).

12. The computer readable medium of claim 10, wherein the processor is to:
    calculate the residual from a block of input video data to be coded using technique (a) and a block of input video data from a preceding frame or a subsequent frame thereto.

13. A video coder comprising:
    a delay element having an input of a block of original video data and an output of a block of original video data delayed for a specified number of frames; and
    a block encoder having a first input of a block of original video data, a second input of the output of the delay element, and an output of a block of coded video data,
    wherein the block encoder is to code the first input or a residual of the first and second inputs according to a technique selected from the group of (a) intra coding, (b) inter coding without a residual, and (c) inter coding with a residual, wherein the block encoder is to discard the second input when coding using techniques (a) and (b), wherein, when coding using technique (c), the block encoder is to code a block of original video data using technique (a) and at least one residual using the block of original video data to be coded using technique (a).

14. The video coder of claim 13, wherein the block encoder is to code a residual determined from the block of original video data to be coded using technique (a) and a preceding block of original video data to provide a backward prediction frame.

15. The video coder of claim 13, wherein the block encoder is to code a residual determined from the block of original video data to be coded using technique (a) and a subsequent block of original video data to provide a forward prediction frame.

16. The video coder of claim 13, wherein the block encoder is to code every third block of original video data using technique (a).

17. A video coding method comprising:
receiving a block of original video data in a current frame;
determining to code the block of original video data according to a technique selected from the group of (a) intra coding, (b) inter coding without a residual, and (c) inter coding with a residual, coding the block of original video data according to the selected technique, when the block is to be coded according to technique (a) or (b), discarding the block of original video data delayed from another frame, and when the block is to be coded according to technique (c),
receiving a block of original video data delayed from another frame, and
coding a residual using the block of original video data in the current frame and the block of original video data delayed from another frame,
wherein the block of original video data in the current frame or the block of original video data delayed from another frame is to be coded using technique (a).

18. The video coding method of claim 17, further comprising:
coding every third block of original video data using technique (a).

19. The video coding method of claim 17, further comprising:
calculating the residual from the block of original video data to be coded using technique (a) and a block of original video data from a preceding frame or a subsequent frame thereto.

* * * * *